United States Patent
Joubert et al.

(10) Patent No.: US 10,017,264 B2
(45) Date of Patent: Jul. 10, 2018

(54) AIRCRAFT AND METHOD OF FITTING OUT SUCH AN AIRCRAFT

(71) Applicant: AIRBUS GROUP SAS, Blagnac (FR)

(72) Inventors: Emmanuel Joubert, Issy les Moulineaux (FR); Benoit Ferran, Paris (FR); Antonin Sanitas, Sollies-Pont (FR); Germain Morin, Ivry sur Seine (FR)

(73) Assignee: AIRBUS GROUP SAS, Blagnac (FR)

( * ) Notice: Subject to any disclaimer, the term of this patent is extended or adjusted under 35 U.S.C. 154(b) by 80 days.

(21) Appl. No.: 14/966,028

(22) Filed: Dec. 11, 2015

(65) Prior Publication Data
US 2016/0167796 A1    Jun. 16, 2016

(30) Foreign Application Priority Data
Dec. 12, 2014 (EP) .................................. 14307018

(51) Int. Cl.
*B64D 41/00* (2006.01)
*B64D 27/24* (2006.01)
(Continued)

(52) U.S. Cl.
CPC ............. *B64D 27/24* (2013.01); *B64D 37/02* (2013.01); *B64D 41/00* (2013.01); *F02B 61/06* (2013.01);
(Continued)

(58) Field of Classification Search
CPC .. B64D 2027/026; B64D 27/24; B64D 37/02; B64D 41/00; B64D 2041/002;
(Continued)

(56) References Cited

U.S. PATENT DOCUMENTS 8,296,036 B2 * 10/2012 Matuszeski ........... B64C 39/024
244/190
2002/0005454 A1 * 1/2002 MacCready ............. B64C 1/26
244/5
(Continued)

FOREIGN PATENT DOCUMENTS

CA         2 391 252 A1    12/2003
DE    20 2007 006976 U1     9/2008
(Continued)

OTHER PUBLICATIONS

EP Search Report, dated May 29, 2015, from corresponding EP application.

*Primary Examiner* — Medhat Badawi
(74) *Attorney, Agent, or Firm* — Young & Thompson

(57) ABSTRACT

The aircraft (10) includes: at least one electric motor (135); at least one stand-alone electrical power supply (110, 120) supplying power to the electric motor; propulsion elements (130) referred to as "auxiliary propulsion elements", included in the group including: a stand-alone electrical power supply (130) supplying power to the electric motor, a power supply converting thermal energy into electrical energy and supplying power to the electric motor, and an internal combustion engine; and a structure (100) configured to integrate each electric motor, each stand-alone electrical power supply and the auxiliary propulsion elements, the parameters of the structure being substantially identical regardless of the auxiliary propulsion elements. A method of fitting out such an aircraft is also described.

7 Claims, 4 Drawing Sheets

(51) Int. Cl.
*B64D 37/02* (2006.01)
*F02B 61/06* (2006.01)
*F02B 65/00* (2006.01)
*B64D 27/02* (2006.01)

(52) U.S. Cl.
CPC ........ *F02B 65/00* (2013.01); *B64D 2027/026* (2013.01); *Y02T 50/64* (2013.01); *Y10S 903/951* (2013.01)

(58) Field of Classification Search
CPC ............ B64D 2041/007; B64D 41/007; B64C 2201/042; B64C 2201/165; B64C 1/26; B64C 2201/021; B64C 2201/086; B64C 2201/104; B64C 29/0016; B64C 29/0033; Y02T 50/64; Y02T 50/12; Y02T 50/44; Y02T 90/36; Y02T 50/62; Y10S 903/951; F01B 21/00; F02B 61/06; F02B 65/00
See application file for complete search history.

(56) References Cited

U.S. PATENT DOCUMENTS

| | | | |
|---|---|---|---|
| 2003/0234320 A1* | 12/2003 | Colting | B64B 1/02 244/96 |
| 2011/0024555 A1* | 2/2011 | Kuhn, Jr. | B64C 29/0033 244/17.25 |
| 2013/0066485 A1* | 3/2013 | Matuszeski | B64C 39/024 701/2 |
| 2013/0140404 A1* | 6/2013 | Parks | G05D 1/102 244/23 A |
| 2013/0227950 A1* | 9/2013 | Anderson | B64D 27/24 60/718 |
| 2015/0021442 A1* | 1/2015 | Hunter | B64D 27/24 244/53 R |
| 2015/0148993 A1* | 5/2015 | Anton | B64D 27/24 701/3 |
| 2016/0236790 A1* | 8/2016 | Knapp | B64C 11/001 |
| 2016/0244158 A1* | 8/2016 | Fredericks | B64C 25/52 |
| 2016/0257416 A1* | 9/2016 | Himmelmann | B64D 27/02 |
| 2017/0057630 A1* | 3/2017 | Schwaiger | B64C 3/385 |

FOREIGN PATENT DOCUMENTS

| | | |
|---|---|---|
| WO | 01/76941 A2 | 10/2001 |
| WO | 2009/054937 A2 | 4/2009 |
| WO | 2010/123601 A1 | 10/2010 |

* cited by examiner

AIRCRAFT AND METHOD OF FITTING OUT SUCH AN AIRCRAFT

FIELD OF THE INVENTION

The present invention concerns an aircraft and a method of fitting out such an aircraft.

The present invention applies to the field of aeronautics.

The present invention applies more particularly to the field of aircraft including a parallel hybrid, serial hybrid or mixed hybrid electric propulsion system.

PRIOR ART

At present, a number of types of mission can be carried out by certain aircraft, such as fighter aircraft that can carry removable additional tanks under the wings. However, when designing these aircraft, the wings of the aircraft are oversized to accept the loads caused by additional tanks and to be able to receive these additional tanks. The oversizing of the wings implies an increase in mass compared to an aircraft not able to incorporate additional tanks, which impacts on the performance of the machine. Moreover, the additional tanks generate high shape drag at high speed that impacts negatively on the performance of the aircraft.

Aircraft are subject to a fixed maximum take-off weight, which leads to a choice having to be made, in order to be able to carry out different types of mission, regarding the distribution of weight between the payload and the quantity of fuel carried.

Currently existing electric propulsion aircraft are aircraft that are initially designed to be thermal propulsion aircraft the structure of which has been modified to integrate electric propulsion means. However, the modifications of the structure are substantial. The modifications include, for example, local reinforcements at the location of the batteries, modifications of the engine pylons to receive the electric motors, modifications of the human/machine interface.

These modifications require a considerable amount of work to remove the components of the thermal propulsion means, to adapt the structure and to integrate the electric propulsion means, and do not make it possible to obtain an optimized electric aircraft.

OBJECT OF THE INVENTION

The present invention aims to remedy some or all of these drawbacks.

To this end, in accordance with a first aspect, the present invention concerns an aircraft that includes:
- at least one electric motor,
- at least one stand-alone electrical power supply supplying power to the electric motor,
- propulsion means referred to as "auxiliary propulsion means", included in the group comprising:
  - a stand-alone electrical power supply supplying power to the electric motor,
  - a power supply converting thermal energy into electrical energy and supplying power to the electric motor, and
  - an internal combustion engine;
- a structure configured to integrate the electric motor, each stand-alone electrical power supply and the auxiliary propulsion means, the parameters of the structure being substantially identical regardless of the auxiliary propulsion means.

The advantage of these embodiments is to design an aircraft, at least partially propelled electrically, that is optimized in terms of centering, mass, overall aerodynamic, fitting out, maintenance and operating cost, technology used.

Moreover, the aircraft is configured to receive hybrid or electric propulsion means although choices made to design a hybrid propulsion aircraft are usually unfavorable for an electric propulsion aircraft and vice versa.

The aircraft in accordance with the present invention includes a structure optimized to integrate modular electric or hybrid propulsion means. In effect, regardless of the auxiliary propulsion means that are integrated into the structure, the flight qualities, structure, balancing of the aircraft are substantially identical.

Also, the down time of an aircraft in accordance with the present invention is reduced, and maintenance operations and maintenance tools can be standardized. Moreover, it is possible to change auxiliary propulsion means after the aircraft is manufactured without modifying the structure of the aircraft.

Finally, an aircraft in accordance with the present invention makes possible a reduction in the overall fitting out cost of 30% for an electric propulsion aircraft and 20% for a hybrid propulsion aircraft compared to a thermal propulsion aircraft. Carbon dioxide emissions are reduced, as is sound pollution, flight phases at low altitude being effected using electric propulsion.

In embodiments, the mass of the aircraft is substantially identical regardless of the auxiliary propulsion means integrated into the structure.

These embodiments have the advantage of having the same designed structure that does not necessitate modifications regardless of the auxiliary propulsion means integrated into the structure.

In embodiments, the location in the structure of the auxiliary propulsion means is substantially identical regardless of the auxiliary propulsion means integrated into the structure.

A substantially identical location of the auxiliary propulsion means has the advantage of not modifying the structure of the aircraft in accordance with the present invention and of maintaining the flight qualities of the aircraft. Moreover, a central location makes it possible to facilitate the balancing of the aircraft.

In embodiments, the structure includes mechanical fixing interfaces for each of the auxiliary propulsion means of the group.

The advantage of these embodiments is to make possible the placement of the auxiliary propulsion means of the group in the structure without modifying the structure regardless of the auxiliary propulsion means chosen.

In embodiments, the aircraft in accordance with the present invention includes cooling means for cooling each stand-alone electrical power supply.

These embodiments have the advantage of preventing overheating of each stand-alone electrical power supply and therefore of increasing the service life of each stand-alone electrical power supply.

In embodiments, the internal combustion engine includes a fuel tank, a mechanical shaft and a transmission box (shown schematically as box 637 in FIG. 6).

The advantage of these embodiments is to have the elements of the internal combustion engine integrated into a predefined location of the structure. These embodiments make it possible to produce a parallel hybrid propulsion aircraft.

In embodiments, the power supply converting thermal energy into electrical energy and supplying power to the electric motor includes a fuel tank and means for converting alternating current into direct current.

The advantage of these embodiments is to have the elements of the power supply converting thermal energy into electrical energy integrated into a location of the structure. These embodiments make it possible to produce a serial hybrid propulsion aircraft.

In accordance with a second aspect, the present invention concerns a method of fitting out an aircraft in accordance with the present invention that includes the following steps:

choice by a user of the auxiliary propulsion means in a group comprising:
  a stand-alone electrical power supply supplying power to the electric motor,
  a power supply converting thermal energy into electrical energy and supplying power to the electric motor, and
  an internal combustion engine;
production of a structure configured to integrate at least one electric motor, at least one stand-alone electrical power supply and the auxiliary propulsion means, the parameters of the structure being substantially identical regardless of the auxiliary propulsion means.

Since the advantages, aims and particular features of the method in accordance with the present invention are similar to those of the aircraft in accordance with the present invention, they are not repeated here.

In embodiments, the method in accordance with the present invention further includes a step of fixing the auxiliary propulsion means to mechanical fixing interfaces.

The advantage of these embodiments is to use the mechanical fixing interfaces that the structure includes for the mechanical fixing interfaces necessary for installing the auxiliary propulsion means.

BRIEF DESCRIPTION OF THE FIGURES

Other advantages, aims and particular features of the invention will emerge from the following nonlimiting description of at least one particular embodiment of an aircraft and of a method of fitting out such an aircraft with reference to the appended drawings, in which.

DESCRIPTION OF EMBODIMENTS OF THE INVENTION

Note first that the figures are not to scale.

The present invention is described by way of nonlimiting example, each feature of any embodiment being advantageously combinable with any other feature of any other embodiment.

Note that the term "one" is used in the sense "at least one".

Figure 1:
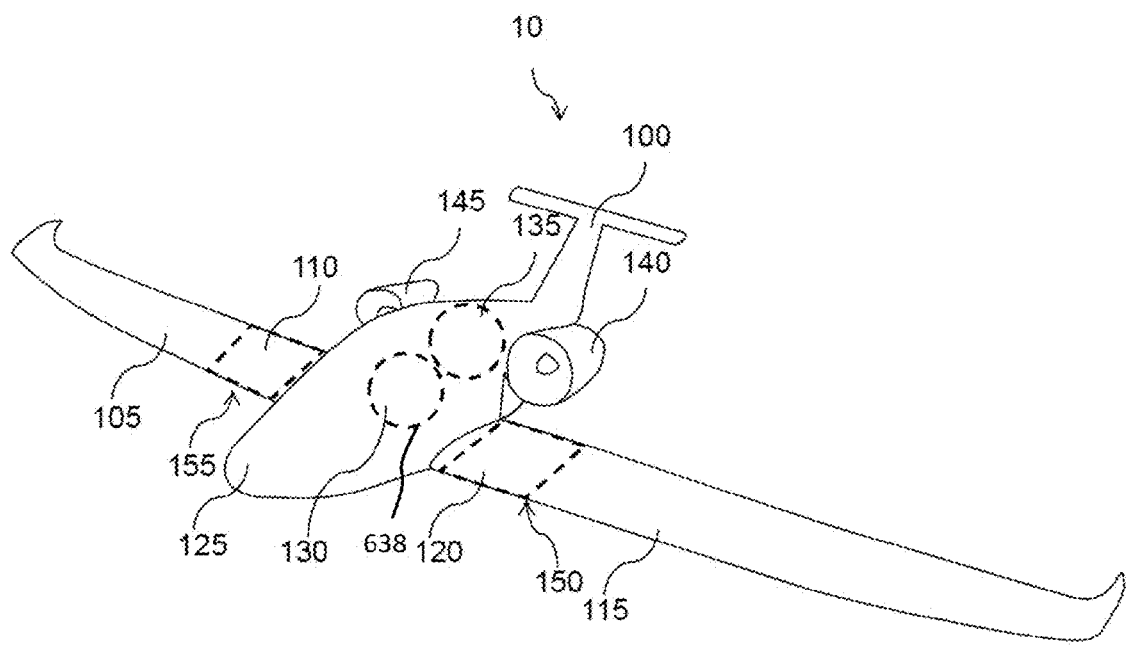
FIG. 1 represents diagrammatically and in perspective a first particular embodiment of an aircraft in accordance with the present invention.

There is seen in FIG. 1 a particular embodiment 10 of an aircraft in accordance with the present invention.

The embodiment 10 of the aircraft in accordance with the present invention includes:
  at least one electric motor 135,
  at least one stand-alone electrical power supply 110 or 120 supplying power to the electric motor 135,
  propulsion means referred to as "auxiliary propulsion means" that comprise a stand-alone electrical power supply 130 supplying power to the electric motor 135,
  a structure 100 configured to integrate the electric motor 135, each stand-alone electrical power supply 110 and 120, and the auxiliary propulsion means, the parameters of the structure 100 being substantially identical for each of the auxiliary propulsion means.

Thus the aircraft 10 is an electric propulsion aircraft.

The structure 100 includes two wings 105 and 115 and a centre section 125. The centre section 125 includes two engines 140 and 145.

An engine 140 or 145 is defined as being a means of creating a force or thrust that results from the acceleration of a mass of air by an airscrew. The engine 140 or 145 is a propeller engine or a jet engine or any other known means.

In embodiments, the centre section 125 includes at least one engine 140 or 145, like a single-engine aircraft, for example. In embodiments, the centre section 125 does not include an engine 140 or 145 and each wing 105 and 115 includes at least one engine 140 or 145. In embodiments, the centre section 125 and each wing 105 and 115 includes at least one engine 140 or 145.

The centre section 125 of the structure 100 preferably includes:
  a cockpit,
  an engine controller for each engine that the aircraft 10 includes and a control for commanding the engine controller,
  an aircraft supervisor for commanding each engine controller, and
  a human/machine interface.

An engine controller is a device for managing the power delivered to an electric motor 135. An engine controller manages the rotation speed of the airscrews of an engine 140 or 145 and therefore the speed of the aircraft 10.

An aircraft supervisor commands each engine controller, performs intelligent management of sensitive functions of the aircraft 10 such as, for example, the management of each stand-alone electrical power supply 110, 120 and 130 of each engine, the generation of alarms and the prediction of a maintenance requirement.

The human/machine interface is an interface for displaying parameters and information in the cockpit and a command interface used by the user of the aircraft 10.

The aircraft 10 is preferably a pilot training aircraft in which the centre section can carry at least two passengers.

The wing 105 includes a stand-alone electrical power supply 110. The stand-alone electrical power supply 110 preferably includes at least one 250 V polymer lithium-ion battery. In embodiments, the stand-alone electrical power supply 110 includes at least one lithium-sulphur battery. In embodiments, the stand-alone electrical power supply 110 includes at least one lithium-air battery.

The stand-alone electrical power supply 110 includes a battery management system (BMS). The BMS monitors the parameters of the stand-alone electrical power supply 110. The parameters monitored are the current, the state of charge and the temperature of the stand-alone electrical power supply 110, for example.

The wing 105 includes cooling means 155 for cooling the stand-alone electrical power supply 110. The cooling means 155 are preferably situated under the wing 105.

The wing 115 includes a stand-alone electrical power supply 120. The stand-alone electrical power supply 120 preferably includes at least one 250 V polymer lithium-ion battery. In embodiments, the stand-alone electrical power supply 120 includes at least one lithium-sulphur battery. In embodiments, the stand-alone electrical power supply 120 includes at least one lithium-air battery.

The stand-alone electrical power supply 120 includes a battery management system (BMS). The BMS monitors the parameters of the stand-alone electrical power supply 120. The parameters monitored are the current, the state of charge and the temperature of the stand-alone electrical power supply 120, for example.

The wing 115 includes cooling means 150 for cooling the stand-alone electrical power supply 120. The cooling means 150 are preferably situated under the wing 115.

The centre section 125 of the structure 100 includes the auxiliary propulsion means. The auxiliary propulsion means 130 comprise a stand-alone electrical power supply 130. The stand-alone electrical power supply 130 preferably includes at least one 250 V polymer lithium-ion battery. In embodiments, the stand-alone electrical power supply 130 includes at least one lithium-sulphur battery. In embodiments, the stand-alone electrical power supply 130 includes at least one lithium-air battery.

The stand-alone electrical power supply 130 includes a battery management system (BMS). The BMS monitors the parameters of the stand-alone electrical power supply 130. The parameters monitored are the current, the state of charge and the temperature of the stand-alone electrical power supply 130, for example.

The stand-alone electrical power supply 130 is preferably situated aft of the locations of seats of the aircraft 10.

The centre section 125 includes cooling means for cooling the stand-alone electrical power supply 130.

The cooling means are preferably situated under the centre section 125.

The centre section 125 includes at least one electric motor 135. The electric motor 135 is supplied with power by the stand-alone electrical power supplies 110, 120 and 130. The electric motor 135 controls the speed of rotation of the airscrews of the engines 140 and 145.

The stand-alone electrical power supplies 110, 120 and 130 supply electrical energy to the engine controller, the aircraft supervisor and the human/machine interface. The engine controller and the aircraft supervisor are preferably microprocessors containing at least one program.

The information from each BMS of each stand-alone electrical power supply 110, 120 or 130 is preferably transmitted to the aircraft supervisor.

The structure 100 includes mechanical fixing interfaces 638 for the auxiliary propulsion means, a power supply converting thermal energy into electrical energy and supplying power to the electric motor 135 and an internal combustion engine. The mechanical fixing interfaces are preferably threaded holes.

The auxiliary propulsion means that comprise a stand-alone electrical power supply may be exchanged for:
  a power supply converting thermal energy into electrical energy and supplying power to the electric motor 135, or
  an internal combustion engine.

At the time of the exchange, the programs of the engine controller and the aircraft supervisor are updated to correspond to the new auxiliary propulsion means.

On changing the auxiliary propulsion means:
  the mass of the aircraft 10 is substantially identical regardless of the auxiliary propulsion means integrated into the structure, and
  the location in the structure 100 of the auxiliary propulsion means is substantially identical regardless of the auxiliary propulsion means integrated into the structure.

Figure 2:
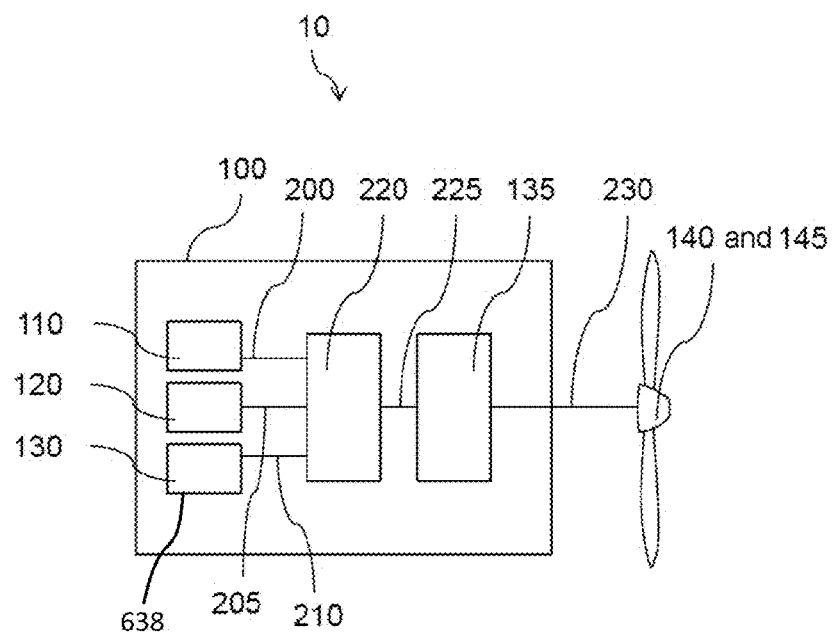
FIG. 2 represents diagrammatically a first particular embodiment of an aircraft in accordance with the present invention.

There is seen in FIG. 2 a first embodiment of an aircraft 10 in accordance with the present invention.

The embodiment 10 of the aircraft in accordance with the present invention includes:
  at least one electric motor 135,
  at least one stand-alone electrical power supply 110 and 120 supplying power to the electric motor 135,
  propulsion means referred to as "auxiliary propulsion means" that comprise a stand-alone electrical power supply supplying power to the electric motor 135,
    a structure 100 configured to integrate the electric motor 135, each stand-alone electrical power supply 110 and 120, and the auxiliary propulsion means, the parameters of the structure 100 being substantially identical regardless of the auxiliary propulsion means.

The direct current 200 from the stand-alone electrical power supply 110, the direct current 205 from the stand-alone electrical power supply 120, and the direct current 210 from the stand-alone electrical power supply 130 are transmitted to an engine controller 220. The engine controller 220 controls the electric current 225 to be transmitted to the electric motor 135.

The current 225 supplies power to the electric motor 135. The electric motor 135 converts the electrical energy into mechanical energy and rotates the shaft 230 at a speed defined by the aircraft supervisor and the engine controller 220. The shaft 230 rotates the airscrews of the engines 140 and 145 included in the structure 100 of the aircraft 10.

Figure 3:
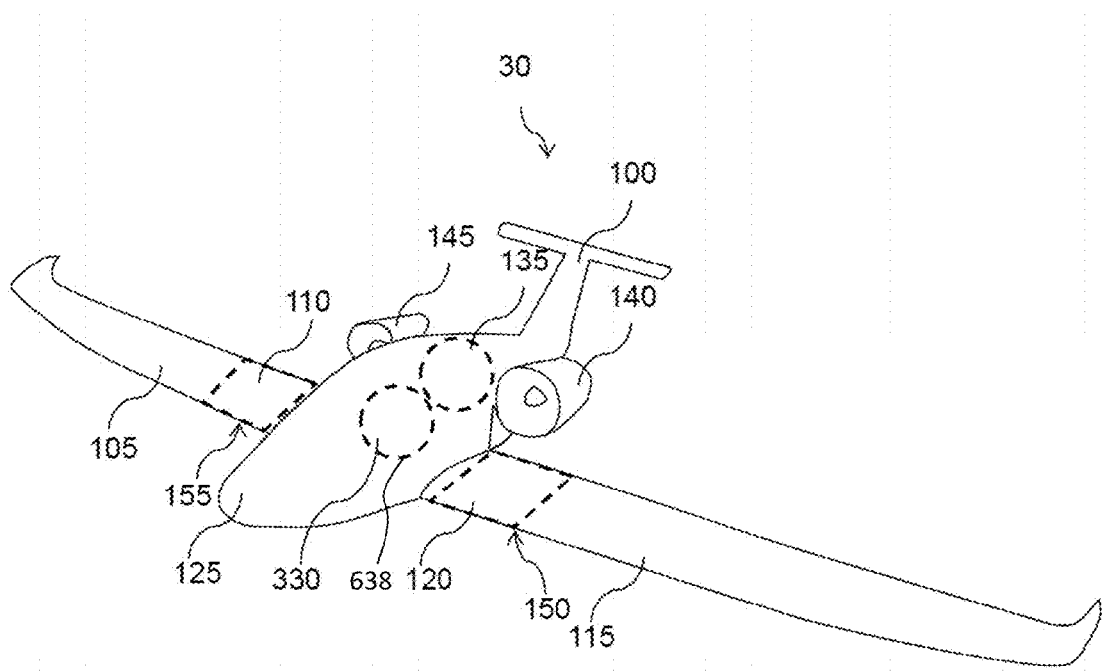
FIG. 3 represents diagrammatically and in perspective a second particular embodiment of an aircraft in accordance with the present invention.

There is seen in FIG. 3 one particular embodiment 30 of an aircraft in accordance with the present invention.

The embodiment 30 of the aircraft in accordance with the present invention includes:
  at least one electric motor 135,
  at least one stand-alone electrical power supply 110 and 120 supplying power to the electric motor 135,
  propulsion means 330 referred to as "auxiliary propulsion means" that comprise a power supply converting thermal energy into electrical energy and supplying power to the electric motor, and
  a structure 100 configured to integrate the electric motor 135, each stand-alone electrical power supply 110 and 120, and the auxiliary propulsion means 330, the parameters of the structure 100 being substantially identical regardless of the auxiliary propulsion means 330.

The aircraft 30 is thus a serial hybrid propulsion aircraft.

The structure 100 includes two wings 105 and 115 and a centre section 125. The centre section 125 includes two engines 140 and 145. In embodiments, the centre section 125 includes at least one engine 140 or 145. In embodiments, the centre section 125 does not include an engine 140 or 145 and each wing 105 and 115 includes at least one engine 140 or 145. In embodiments, the centre section 125 and each wing 105 and 115 includes at least one engine 140 or 145.

The centre section 125 of the structure 100 preferably includes:
- a cockpit,
- an engine controller for each electric motor 135 that the aircraft 30 includes and a control for commanding the engine controller,
- an aircraft supervisor 30 commanding each engine controller, and
- a human/machine interface.

An engine controller is a device managing the power delivered to an electric motor 135. An engine controller manages the rotation speed of the airscrews of an engine 140 or 145 and therefore the speed of the aircraft 30.

An aircraft supervisor controls each engine controller, performs the intelligent management of sensitive functions of the aircraft 30 such as, for example, the management of each stand-alone electrical power supply 110 or 120, of each engine, the generation of alarms and the prediction of a maintenance requirement.

The human/machine interface is an interface for display of parameters and information in the cockpit and a control interface used by the user of the aircraft 30.

The aircraft 30 is preferably a pilot training aircraft in which the centre section 125 can carry at least two passengers.

The wing 105 includes a stand-alone electrical power supply 110. The stand-alone electrical power supply 110 preferably includes at least one 250 V polymer lithium-ion battery. In embodiments, the stand-alone electrical power supply 110 includes at least one lithium-sulphur battery. In embodiments, the stand-alone electrical power supply 110 includes at least one lithium-air battery.

The stand-alone electrical power supply 110 includes a battery management system (BMS). The BMS monitors the parameters of the stand-alone electrical power supply 110. The parameters monitored are the current, the state of charge and the temperature of the stand-alone electrical power supply 110, for example.

The wing 105 includes cooling means 155 for cooling the stand-alone electrical power supply 110. The cooling means 155 are preferably situated under the wing 105.

The wing 115 includes a stand-alone electrical power supply 120. The stand-alone electrical power supply 120 preferably includes at least one 250 V polymer lithium-ion battery. In embodiments, the stand-alone electrical power supply 120 includes at least one lithium-sulphur battery. In embodiments, the stand-alone electrical power supply 120 includes at least one lithium-air battery.

The stand-alone electrical power supply 120 includes a battery management system (BMS). The BMS monitors the parameters of the stand-alone electrical power supply 120. The parameters monitored are the current, the state of charge and the temperature of the stand-alone electrical power supply 120, for example.

The wing 115 includes cooling means 150 for cooling the stand-alone electrical power supply 120. The cooling means 150 are preferably situated under the wing 115.

The centre section 125 of the structure 100 includes the auxiliary propulsion means 330. The auxiliary propulsion means 330 comprise a power supply converting thermal energy into electrical energy and supplying power to the electric motor 135. The auxiliary propulsion means 330 preferably include an internal combustion engine, a generator, a fuel tank and means for converting alternating current into direct current. The means for converting alternating current into direct current comprise a rectifier, for example. The electrical energy produced by the generator by the combustion of the fuel contained in the fuel tank by the internal combustion engine is rectified and then transmitted to the electric motor 135.

The auxiliary propulsion means 330 are preferably situated aft of the locations of seats of the aircraft.

The centre section 125 includes cooling means for cooling the auxiliary propulsion means 330. The cooling means are preferably situated under the centre section 125. The cooling means preferably contain a liquid circulated by a pump and cooled by means of a heat exchanger in contact with the surrounding air.

The centre section includes at least one electric motor 135. The electric motor 135 is supplied with power by the stand-alone electrical power supplies 110 and 120 and by the auxiliary propulsion means 330. The electric motor 135 controls the rotation speed of the airscrews of the engines 140 and 145.

The stand-alone electrical power supplies 110 and 120 and the auxiliary propulsion means supply electrical energy to the engine controller, the aircraft supervisor and the human/machine interface. The engine controller and the aircraft supervisor are preferably microprocessors containing at least one program.

The information from each BMS of each stand-alone electrical power supply 110 or 120 is preferably transmitted to the aircraft supervisor.

The structure 100 includes mechanical fixing interfaces for the auxiliary propulsion means 330 and a stand-alone electrical power supply supplying power to the electric motor 135 and an internal combustion engine. The mechanical fixing interfaces are preferably threaded holes. For fixing the auxiliary propulsion means 330, fixing cradles are preferably placed in the mechanical fixing interfaces.

The auxiliary propulsion means 330 that comprise a power supply converting thermal energy into electrical energy and supplying power to the electric motor may be exchanged for:
- a stand-alone electrical power supply supplying power to the electric motor 135,
- an internal combustion engine.

At the time of the exchange, the programs of the engine controller and the aircraft supervisor are updated to correspond to the new auxiliary propulsion means 330.

On changing the auxiliary propulsion means 330:
- the mass of the aircraft 30 is substantially identical regardless of the auxiliary propulsion means 330 integrated into the structure, and
- the location in the structure 100 of the auxiliary propulsion means 330 is substantially identical regardless of the auxiliary propulsion means 330 integrated into the structure.

Figure 4:
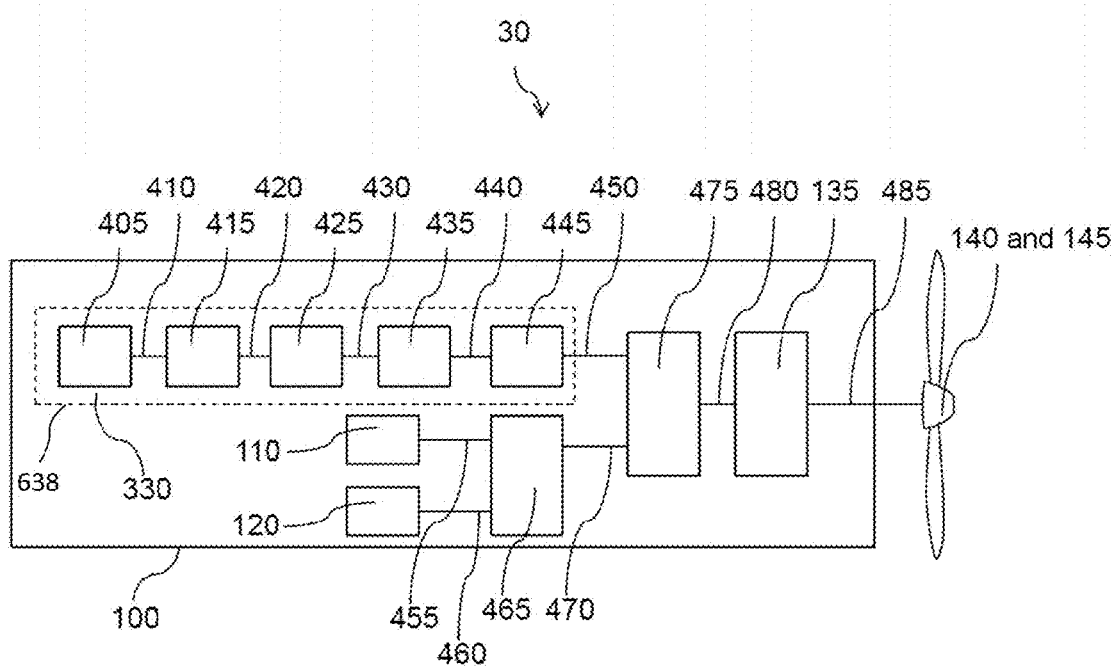
FIG. 4 represents diagrammatically a second particular embodiment of an aircraft in accordance with the present invention.

There is seen in FIG. 4 a second embodiment of an aircraft 30 in accordance with the present invention.

The embodiment 30 of the aircraft in accordance with the present invention includes:
- at least one electric motor 135,
- at least one stand-alone electrical power supply 110 and 120 supplying power to the electric motor 135,
- propulsion means 330 referred to as "auxiliary propulsion means" that comprise a power supply converting thermal energy into electrical energy and supplying power to the electric motor, and
- a structure 100 configured to integrate the electric motor 135, each stand-alone electrical power supply 110 and 120, and the auxiliary propulsion means 330, the parameters of the structure 100 being substantially identical regardless of the auxiliary propulsion means 330.

The auxiliary propulsion means 330 include:
- a fuel tank 405 containing fuel,
- an internal combustion engine 415,
- a generator 425,
- means 435 for converting alternating current into direct current, and
- a chopper 445.

Fuel 410 coming from the tank 405 feeds the internal combustion engine 415. The mechanical energy 420 produced by the internal combustion engine 415 is transmitted to a generator 425 that converts the mechanical energy 420 into electrical energy 430. The electrical energy 430 from the generator is transmitted to means 435 for converting alternating current 430 into direct current 440. The voltage of the current 440 is modified by a chopper 445 to a voltage 450 compatible with the engine controller 475 and with the electric motor 135. The voltage 450 is supplied to the engine controller 475.

The direct current 455 from the stand-alone electrical power supply 110 and the direct current 460 from the stand-alone electrical power supply 120 are transmitted to a current converter 465. The current converter 465 combines the direct currents 455 and 460 into a current 470. The current 470 feeds the engine controller 475.

The engine controller 475 transmits to the electric motor 135 an electrical current 480 created from the electrical current 450 from the alternative propulsion means and the electrical current 470 from the stand-alone electrical power supplies 110 and 120.

The engine controller 475 controls the electrical current 480 to be transmitted to the electric motor 135. The current 480 supplies power to the electric motor 135. The electric motor 135 converts the electrical energy into mechanical energy and rotates the shaft 485 at a speed defined by the aircraft supervisor and the engine controller 475. The shaft 485 rotates the airscrews of the engines 140 and 145 that the structure 100 of the aircraft 30 includes.

Figure 5:
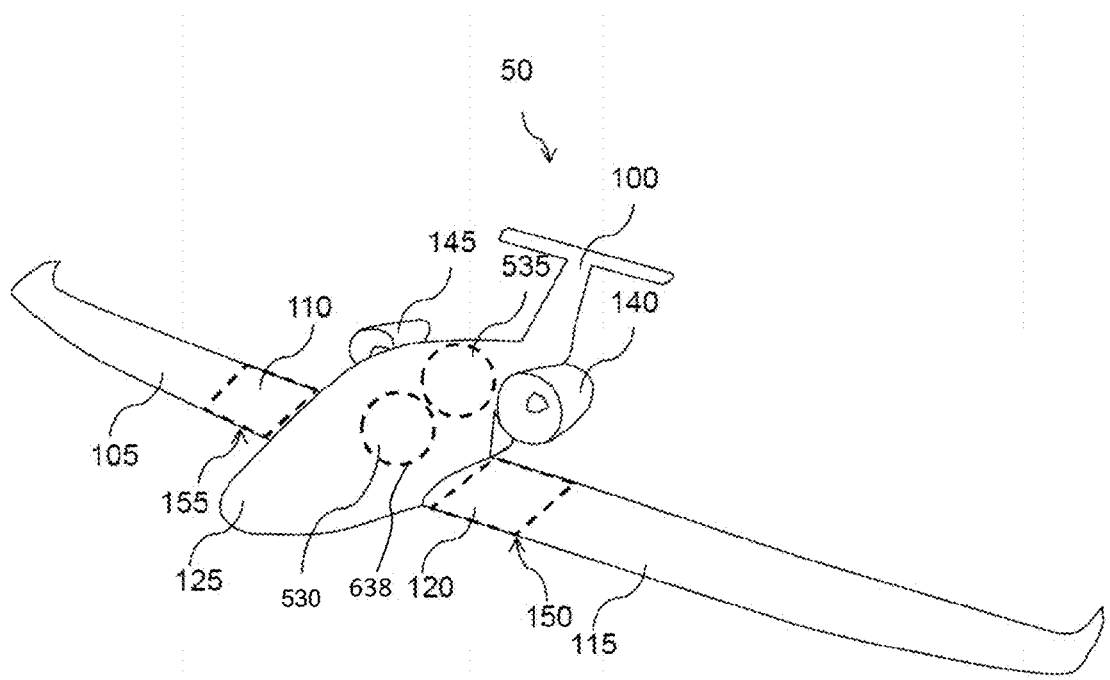
FIG. 5 represents diagrammatically and in perspective a third particular embodiment of an aircraft in accordance with the present invention.

There is seen in FIG. 5 a third particular embodiment of an aircraft in accordance with the present invention.

The embodiment 50 of the aircraft in accordance with the present invention includes:
- at least one electric motor 135,
- at least one stand-alone electrical power supply 110 and 120 supplying power to the electric motor 135,
- propulsion means 530 referred to as "auxiliary propulsion means" that comprise an internal combustion engine, and
- a structure 100 configured to integrate the electric motor 135, each stand-alone electrical power supply 110 and 120, and the auxiliary propulsion means 530, the parameters of the structure 100 being substantially identical regardless of the auxiliary propulsion means 530.

The aircraft 50 is therefore a parallel hybrid propulsion aircraft.

The structure 100 includes two wings 105 and 115 and a centre section 125. The centre section 125 includes two engines 140 and 145. In embodiments, the centre section 125 includes at least one engine 140 or 145. In embodiments, the centre section 125 does not include an engine 140 or 145 and each wing 105 and 115 includes at least one engine 140 or 145. In embodiments, the centre section 125 and each wing 105 and 115 includes at least one engine 140 and 145.

The centre section 125 of the structure 100 preferably includes:
- a cockpit,
- an engine controller for each engine that the aircraft 50 includes and a control for commanding the engine controller,
- an aircraft supervisor commanding each engine controller, and
- a human/machine interface.

An engine controller is a device for managing the power delivered to an electric motor 135. An engine controller manages the rotation speed of the airscrews of an engine 140 or 145 and therefore the speed of the aircraft 50.

An aircraft supervisor controls each engine controller, performs the intelligent management of sensitive functions of the aircraft 50 such as, for example, the management of each stand-alone electrical power supply 110 or 120, of each engine, the generation of alarms and the prediction of a maintenance requirement.

The human/machine interface is an interface for displaying parameters and information in the cockpit and a control interface used by the user of the aircraft 50.

The aircraft 50 is preferably a pilot training aircraft in which the centre section 125 can contain at least two passengers.

The wing 105 includes a stand-alone electrical power supply 110. The stand-alone electrical power supply 110 preferably includes at least one 250 V polymer lithium-ion battery. In embodiments, the stand-alone electrical power supply 110 includes at least one lithium-sulphur battery. In embodiments, the stand-alone electrical power supply 110 includes at least one lithium-air battery.

The stand-alone electrical power supply 110 includes a battery management system (BMS). The BMS monitors the parameters of the stand-alone electrical power supply 110. The parameters monitored are the current, the state of charge and the temperature of the stand-alone electrical power supply 110, for example.

The wing 105 includes cooling means 155 for cooling the stand-alone electrical power supply 110. The cooling means 155 are preferably situated under the wing 105.

The wing 115 includes a stand-alone electrical power supply 120. The stand-alone electrical power supply 120 preferably includes at least one 250 V polymer lithium-ion battery. In embodiments, the stand-alone electrical power supply 120 includes at least one lithium-sulphur battery. In embodiments, the stand-alone electrical power supply 120 includes at least one lithium-air battery.

The stand-alone electrical power supply 120 includes a battery management system (BMS). The BMS monitors the parameters of the stand-alone electrical power supply 120.

The parameters monitored are the current, the state of charge and the temperature of the stand-alone electrical power supply 120, for example.

The wing 115 includes cooling means 150 for cooling the stand-alone electrical power supply 120. The cooling means 150 are preferably situated under the wing 115.

The centre section 125 of the structure 100 includes the auxiliary propulsion means 530. The auxiliary propulsion means 530 comprise an internal combustion engine rotating the engines 140 and 145 in parallel with the electric motor 135. The auxiliary propulsion means 530 preferably include a fuel tank, a mechanical shaft and a transmission box. The fuel is burned in the internal combustion engine, which transmits a torque to the mechanical shaft and then to the transmission box. The transmission box rotates the airscrews of the engines 140 and 145.

The auxiliary propulsion means 530 are preferably situated aft of the locations of seats of the aircraft 50.

The centre section 125 includes cooling means for cooling the auxiliary propulsion means 530. The cooling means are preferably situated under the centre section 125. The cooling means preferably contain a liquid circulated by a pump and cooled by means of a heat exchanger in contact with the surrounding air.

The centre section 125 includes at least one electric motor 135. The electric motor 135 is supplied with power by the stand-alone electrical power supplies 110 and 120. The electric motor 135 controls the rotation speed of the airscrews of the engines 140 and 145.

The stand-alone electrical power supplies 110 and 120 supply electrical energy to the engine controller, the aircraft supervisor and the human/machine interface. The engine controller and the aircraft supervisor are preferably microprocessors containing at least one program.

The information from each BMS of each stand-alone electrical power supply 110 or 120 is preferably transmitted to the aircraft supervisor.

The structure 100 includes mechanical fixing interfaces for the auxiliary propulsion means 530 and a stand-alone electrical power supply supplying power to the electric motor 135 and a power supply converting mechanical energy into electrical energy and supplying power to the electric motor 135. The mechanical fixing interfaces are preferably threaded holes. For fixing the auxiliary propulsion means 530, fixing cradles are preferably placed in the mechanical fixing interfaces.

The auxiliary propulsion means 530 that comprise an internal combustion engine may be exchanged for:
- a stand-alone electrical power supply supplying power to the electric motor 135,
- a power supply converting mechanical energy into electrical energy and supplying power to the electric motor 135.

At the time of the exchange, the programs of the engine controller and the aircraft supervisor are updated to correspond to the new auxiliary propulsion means.

On changing the auxiliary propulsion means 530:
- the mass of the aircraft 50 is substantially identical regardless of the auxiliary propulsion means 530 integrated into the structure, and
- the location in the structure 100 of the auxiliary propulsion means 530 is substantially identical regardless of the auxiliary propulsion means 530 integrated into the structure.

Figure 6:
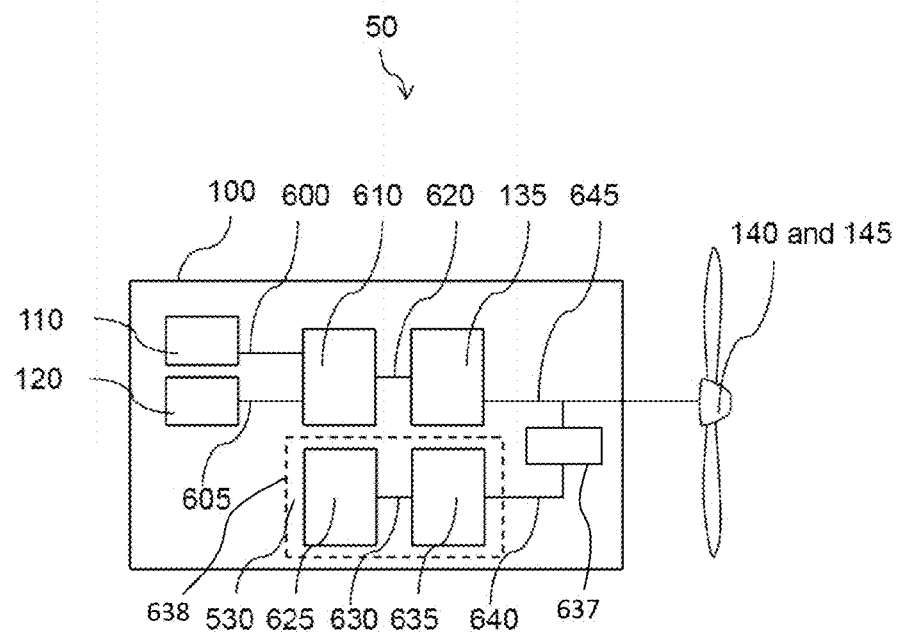
FIG. 6 represents diagrammatically a third particular embodiment of an aircraft in accordance with the present invention.

There is seen in FIG. 6 a third embodiment of an aircraft 50 in accordance with the present invention.

The embodiment 50 of the aircraft in accordance with the present invention includes:
- at least one electric motor 135,
- at least one stand-alone electrical power supply 110 and 120 supplying power to the electric motor 135,
- propulsion means 530 referred to as "auxiliary propulsion means" that comprise an internal combustion engine, and
- a structure 100 configured to integrate the electric motor 135, each stand-alone electrical power supply 110 and 120, and the auxiliary propulsion means 530, the parameters of the structure 100 being substantially identical regardless of the auxiliary propulsion means 530.

The direct current 600 from the stand-alone electrical power supply 110 and the direct current 600 from the stand-alone electrical power supply 120 are transmitted to an engine controller 610. The engine controller 610 controls the electrical current 620 to be transmitted to the electric motor 135. The current 620 supplies power to the electric motor 135.

The electric motor 135 converts electrical energy into mechanical energy and rotates the shaft 645 at a speed defined by the aircraft supervisor and the engine controller 610. The shaft 645 rotates the airscrews of the engines 140 and 145 that the structure 100 of the aircraft 50 includes.

The auxiliary propulsion means 530 include a tank 625 for fuel 630, a mechanical shaft 640 and a transmission box 637. The fuel 625 is burned in the internal combustion engine 635 that transmits a torque to the mechanical shaft 640 and then to the transmission box 637. The transmission box rotates the airscrews of the engines 140 and 145 that the structure 100 of the aircraft 50 includes.

Figure 7:
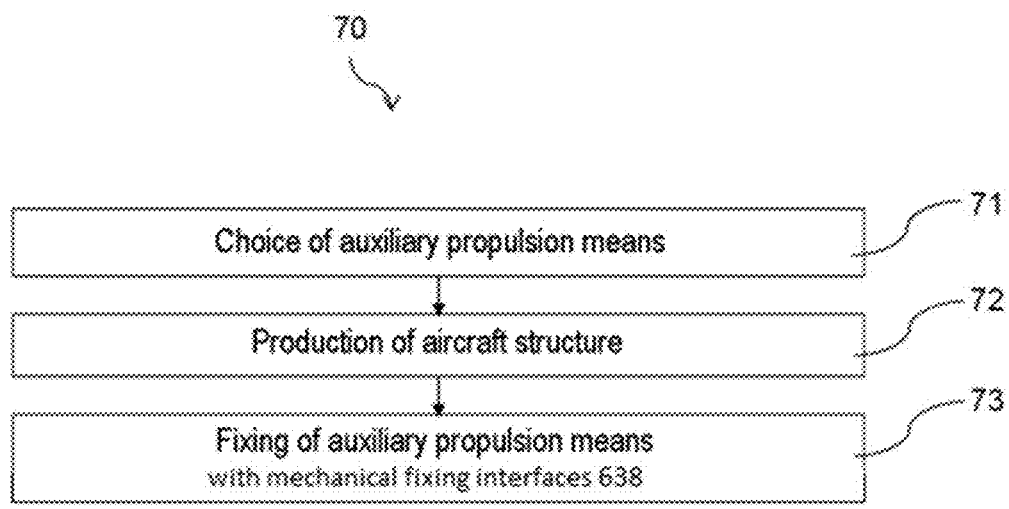
FIG. 7 represents in the form of a flowchart a first embodiment of a method in accordance with the present invention.

There is seen in FIG. 7 an embodiment of a method of fitting out an aircraft in accordance with the present invention that includes the following steps:
- choice 71 by a user of the auxiliary propulsion means 130, 330 or 530 in a group comprising:
  - a stand-alone electrical power supply 130 supplying power to the electric motor,
  - a power supply 330 converting thermal energy into electrical energy and supplying power to the electric motor, and
  - an internal combustion engine 530;
- production 72 of a structure 100 configured to integrate at least one electric motor 135, at least one stand-alone electrical power supply 110 and 120 and the auxiliary propulsion means 130, 330 or 530, the parameters of the structure being substantially identical regardless of the auxiliary propulsion means 130, 330 or 530, and
- fixing 73 the auxiliary propulsion means 130, 330 or 530 to mechanical fixing interfaces.

During the choice step 71, a user defines the auxiliary propulsion means required in the aircraft. The choice 71 of the auxiliary propulsion means defines if the aircraft is a serial hybrid or parallel hybrid electric propulsion aircraft. An electric propulsion aircraft 10 includes by way of auxiliary propulsion means a stand-alone electrical power supply 130 supplying power to the electric motor 135. A serial hybrid propulsion aircraft 30 includes by way of auxiliary propulsion means a power supply 330 converting thermal energy into electrical energy and supplying power to the electric motor 135. A serial hybrid propulsion aircraft 50 includes by way of auxiliary propulsion means an internal combustion engine 530.

The choice of the auxiliary propulsion means leads to the production 72 of a structure 100 configured to integrate at least one electric motor 135, at least one stand-alone electrical power supply 110 or 120 and the auxiliary propulsion means 130, 330 or 530, the parameters of the structure 100 being substantially identical regardless of the auxiliary propulsion means.

The mass of the aircraft 10, 30 or 50 produced is substantially identical regardless of the auxiliary propulsion means 130, 330 or 530 integrated into the structure 100. The location in the structure 100 of the auxiliary propulsion means 130, 330 or 530 is substantially identical regardless of the auxiliary propulsion means integrated into the structure 100. The structure includes mechanical fixing interfaces for each of the auxiliary propulsion means 130, 330 and 530 of the group.

Once the aircraft has been produced, the auxiliary propulsion means are fixed to the structure by mechanical fixing interfaces in the fixing step 73.

As the structure 100 of the aircraft 10, 30 or 50 is substantially the same regardless of the auxiliary propulsion means 130, 330 or 530 chosen, the auxiliary propulsion means 130, 330 or 530 are modular and can be exchanged for other auxiliary propulsion means 130, 330 or 530 during the service life of the aircraft 10, 30 or 50. Moreover, the mechanical fixing interfaces pre-exist in the structure 100 of the aircraft regardless of the auxiliary propulsion means 130, 330 or 530 chosen. The structure 100 is therefore unchanged on changing the auxiliary production means 130, 330 or 530.

The invention claimed is:

1. An aircraft (10, 30, 50) comprising: at least one aircraft engine 140, 145) that creates a force for acceleration of a mass of the aircraft; at least one electric motor (135) connected to drive the at least one aircraft engine (140 145); at least one primary stand-alone electrical power supply (110, 120) supplying power to the at least one electric motor (135), a propulsion unit (130, 330, 530) referred to as "an auxiliary propulsion unit", included in the group comprising: an auxiliary stand-alone electrical power supply (130) supplying power to the at least one electric motor (135), a power supply (330) converting thermal energy into electrical energy and supplying power to the at least one electric motor (135), said power supply (330) including a generator (425), a tank (405) for fuel (410) for an engine (415), and a current converting unit (435) for converting alternating current from the generator (425) into direct current for supplying the power to the at least one electric motor (135), and an internal combustion engine (530) connected to drive the at least one aircraft engine (140, 145); and a structure (100) configured to integrate each electric motor, each stand-alone electrical power supply and the auxiliary propulsion unit, wherein parameters of the structure are substantially identical for each of the auxiliary propulsion unit (130, 330, 530) of the group, said parameters including the mass of the aircraft, and a location of the auxiliary propulsion unit within the structure, and wherein the auxiliary propulsion unit (130, 330, 530) is exchangeable from a first one of the group to another one of the group, after the aircraft is manufactured and without modifying the structure, and the structure (100) includes mechanical fixing interfaces (638) for each auxiliary propulsion unit (130, 330, 530) of the group.

2. The aircraft (10, 30, 50) of claim 1, including a cooling unit for cooling each stand-alone electrical power supply (110, 120, 130).

3. The aircraft (50) of claim 1, wherein the internal combustion engine (530) includes a tank (625) for fuel (630), a mechanical shaft (640) and a transmission box (637).

4. A method (70) of fitting out an aircraft (10, 30, 50) having at least one electric motor that drives at least one aircraft engine (140, 145) that creates a force for acceleration of a mass of the aircraft, the method comprising the following steps: choice (71) by a user of an auxiliary propulsion unit (130, 330, 530) selected from the group comprising: i) an auxiliary stand-alone electrical power supply (130) supplying power to the at least one electric motor (135), ii) a power supply (330) converting thermal energy into electrical energy and supplying power to the at least one electric motor, said power supply (330) including a generator (425), a tank (405) for fuel (410) for an engine (415), and a current converting unit (435) for converting alternating current from the generator (425) into direct current for supplying the power to the at least one electric motor, and iii) an internal combustion engine (530) connected to drive the at least one aircraft engine (140, 145); production (72) of a structure (100) configured to integrate the at least one electric motor, the at least one stand-alone electrical power supply, and the auxiliary propulsion unit (130, 330, 530) chosen in the choice step, said structure including mechanical fixing interfaces (638) for each auxiliary propulsion unit (130, 330, 530) of the group; and integrating the at least one electric motor, the at least one stand-alone electrical power supply, and the auxiliary propulsion unit (130, 330, 530) chosen in the choice step into the structure (100), wherein the auxiliary propulsion unit is integrated in an exchangeable way, and the parameters of the structure are substantially identical for each of the auxiliary propulsion unit, said parameters including the mass of the aircraft and a location of the auxiliary propulsion unit within the structure.

5. the method (70) of claim 4, further including a step (73) of fixing the auxiliary propulsion unit (130, 330, 530) to mechanical fixing interfaces (638).

6. The aircraft (50) of claim 2, wherein the internal combustion engine (530) includes a tank (625) for fuel (630), a mechanical shaft (640) and a transmission box (637).

7. The aircraft (10, 30, 50) of claim 1, wherein,
the mechanical fixing interfaces (638) each include threaded holes.

* * * * *